United States Patent
Smith et al.

(10) Patent No.: US 8,137,599 B2
(45) Date of Patent: Mar. 20, 2012

(54) METHOD FOR CONDUIT EXPANSION

(75) Inventors: Mark A. Smith, Natrona Heights, PA (US); Thomas Marti, Mars, PA (US); Bryan St. Onge, Hastings (CA); Henri St. Onge, Hastings (CA)

(73) Assignee: Underground Solutions Technologies Group, Inc., Poway, CA (US)

( * ) Notice: Subject to any disclaimer, the term of this patent is extended or adjusted under 35 U.S.C. 154(b) by 251 days.

(21) Appl. No.: 12/347,121

(22) Filed: Dec. 31, 2008

(65) Prior Publication Data

US 2009/0127749 A1     May 21, 2009

Related U.S. Application Data

(62) Division of application No. 10/865,503, filed on Jun. 10, 2004, now abandoned.

(60) Provisional application No. 60/478,508, filed on Jun. 13, 2003, provisional application No. 60/478,513, filed on Jun. 13, 2003.

(51) Int. Cl.
- *B29C 73/00* (2006.01)
- *B29C 45/17* (2006.01)
- *B29C 45/14* (2006.01)
- *B29B 15/00* (2006.01)

(52) U.S. Cl. .......... 264/36.17; 264/36.16; 264/40.3; 264/516; 264/521; 264/564

(58) Field of Classification Search .......... 264/36.16, 264/36.17, 40.3, 516, 521, 564
See application file for complete search history.

(56) References Cited

U.S. PATENT DOCUMENTS

| | | | |
|---|---|---|---|
| 4,026,329 A | 5/1977 | Thompson | |
| 4,067,349 A | 1/1978 | Austin et al. | |
| 4,162,093 A | 7/1979 | Sigmund | |
| 4,361,451 A | 11/1982 | Renaud | |
| 4,646,787 A | 3/1987 | Rush et al. | |
| 4,671,840 A | 6/1987 | Renaud | |
| 4,691,728 A | 9/1987 | Mathison | |
| 4,728,223 A | 3/1988 | Rice | |
| 4,778,553 A | 10/1988 | Wood | |
| 4,980,116 A | 12/1990 | Driver | |
| 5,225,121 A | 7/1993 | Yokoshima | |
| 5,346,658 A | 9/1994 | Gargiulo | |
| 5,368,809 A | 11/1994 | Steketee, Jr. | |
| 5,397,513 A | 3/1995 | Steketee, Jr. | |
| 5,399,301 A | 3/1995 | Menendez et al. | |
| 5,439,033 A * | 8/1995 | Kamiyama et al. | 138/98 |

(Continued)

FOREIGN PATENT DOCUMENTS

EP     1001206 A     5/2000

(Continued)

OTHER PUBLICATIONS

U.S. Appl. No. 10/865,739, filed Jun. 10, 2004.

(Continued)

*Primary Examiner* — Yogendra Gupta
*Assistant Examiner* — Jeremiah Smith
(74) *Attorney, Agent, or Firm* — The Webb Law Firm

(57) ABSTRACT

Disclosed is a conduit expansion method, including: inserting a liner conduit formed from a polyvinyl chloride material at least partially within a host conduit; circulating fluid within an inner area of the liner conduit; and injecting fluid into the inner area of the liner conduit; wherein the liner conduit at least partially expands within the host conduit.

17 Claims, 3 Drawing Sheets

U.S. PATENT DOCUMENTS

| | | | |
|---|---|---|---|
| 5,462,706 A | 10/1995 | McMillan et al. | |
| 5,487,411 A | 1/1996 | Goncalves | |
| 5,490,964 A | 2/1996 | Kamiyama et al. | |
| 5,501,248 A | 3/1996 | Kiest, Jr. | |
| 5,503,190 A | 4/1996 | Kamiyama et al. | |
| 5,503,695 A * | 4/1996 | Imoto et al. | 156/71 |
| 5,601,763 A | 2/1997 | Hunter et al. | |
| 5,706,861 A | 1/1998 | Wood et al. | |
| 5,794,662 A | 8/1998 | St. Onge et al. | |
| 5,816,293 A | 10/1998 | Kiest, Jr. | |
| 5,855,729 A | 1/1999 | Kiest, Jr. et al. | |
| 5,924,455 A | 7/1999 | Jo et al. | |
| 5,927,341 A | 7/1999 | Taylor | |
| 6,050,300 A | 4/2000 | Schwert et al. | |
| 6,053,211 A | 4/2000 | Schwert et al. | |
| 6,093,363 A | 7/2000 | Polivka | |
| 6,228,312 B1 | 5/2001 | Boyce | |
| 6,270,289 B1 | 8/2001 | Einhaus et al. | |
| 6,276,398 B1 | 8/2001 | Lange | |
| 6,299,803 B1 | 10/2001 | Ledoux | |
| 6,416,692 B1 | 7/2002 | Iwasaki-Higbee | |
| 6,539,979 B1 * | 4/2003 | Driver | 138/98 |
| 7,000,643 B2 | 2/2006 | St. Onge et al. | |
| 2003/0015247 A1 | 1/2003 | Driver et al. | |
| 2009/0038703 A1 | 2/2009 | Smith et al. | |

FOREIGN PATENT DOCUMENTS

| | | |
|---|---|---|
| JP | 08127069 A | 5/1996 |
| WO | 0177569 A | 10/2001 |

OTHER PUBLICATIONS

U.S. Appl. No. 12/254,240, filed Oct. 20, 2008.

* cited by examiner

METHOD FOR CONDUIT EXPANSION

CROSS REFERENCE TO RELATED APPLICATIONS

This application is a divisional application of U.S. application Ser. No. 10/865,503, filed Jun. 10, 2004, which takes priority from U.S. Provisional Patent Application Nos. 60/478,508 and 60/478,513, both filed Jun. 13, 2003, all of which are incorporated herein by reference in their entirety.

BACKGROUND OF THE INVENTION

1. Field of the Invention

The present invention relates generally to systems for expanding conduit, such as polyvinyl chloride piping, and in particular to a fluid processing system for injecting and recycling fluid to and from a conduit expansion system, and to a mobile or transportable arrangement and fluid processing system.

2. Description of Related Art

Conduit systems are used extensively throughout the world in order to transfer or convey material, such as water and other fluids, from location to location for distribution throughout the system. For example, extensive conduit systems are used to distribute water to both residences and businesses for use and further processes. Typically, such conduit or piping systems are located underground, as aboveground piping would be both unsightly and intrusive.

Typical water conduit systems transport material through pipe, e.g., cast iron, ductile iron, reinforced concrete, cement-asbestos, etc., buried underground with the branches extending in various directions in order to reach the end user. Normally, after many years of use, or for some other reason, the present piping fails and begins to leak, thereby reducing line pressure and unnecessarily allowing water to leak into the area surrounding the piping. Such leaks not only affect the system, but also increase the processing costs of the supplier, which, in turn, increases the end user costs. Therefore, these leaks must be quickly repaired and preventative measures taken to ensure that further leakage is prevented.

Due to the underground positioning of the conduit system, repairing a leaking pipe is particularly labor intensive and time consuming. Trenches must be dug along the pipeline to locate the leak and effectively repair it prior to putting the pipe back in service. Various lining systems have been developed according to the prior art in an attempt to seal a leaking pipe or a pipe that has fallen into disrepair, whether to repair a present crack or to preventatively ensure against future cracks or breaks. In addition, the use of a much smaller diameter pipe within the larger diameter cracked or broken pipe has been used. However, this merely replaces the problem of a cracked outer pipe with a cracked or otherwise leaking inner pipe. Still further, using such a pipe-in-pipe system drastically reduces the flow through the conduit system and evidences unwanted and varying pressure parameters.

To that end, a pipe liner and method of installation have been developed, as disclosed in U.S. Pat. No. 5,794,662 to St. Onge et al., specifically directed to pressurized pipeline applications. The St. Onge patent is directed to a method of relining sewer lines, water lines or gas lines, and uses a segmented liner of reduced size relative to the pipe being relined. However, as opposed to merely leaving the small diameter liner conduit within the large diameter outer conduit, the method of the St. Onge patent uses heat and/or pressure to mold the reduced size pipe to the shape of the pipe being relined. In particular, the inner or liner conduit is a thermoplastic pipe, typically a polyvinyl chloride (PVC) pipe that, when exposed to heat or pressure, expands and molds against the inside of an existing conduit to effect the relining of it. This process allows for both the lining of the entire length of pipe or only a portion of it that is damaged, which is typically referred to as "spot repair."

According to the St. Onge patent, once the length of the liner conduit is inserted into the existing or host conduit, the liner conduit is plugged at either end and exposed to steam under pressure to heat the liner conduit along its length and apply pressure, which urges it to expand and contact the interior walls of the surrounding host conduit. Once the liner conduit has fully expanded to conform to the interior surface of the existing conduit, it is cooled and the plugs are removed. The resulting expanded liner conduit conforms to the walls of the host conduit, thereby preventing any further leakage. Also, the method of the St. Onge patent requires only pits to be dug at either end of the section to be repaired.

While the St. Onge patent represents an advance in the art of relining or repairing underground conduit systems, there is room in the art for additional improvements and advancements. Further, the injection or insertion of material or objects into a conduit, for use in repairing or replacing damaged pipe, is known in the art. For example, see U.S. Pat. No. 6,228,312 to Boyce; U.S. Pat. No. 5,503,190 to Kamiyama et al.; U.S. Pat. No. 5,490,964 to Kamiyama et al.; U.S. Pat. No. 5,225,121 to Yokoshima; U.S. Pat. No. 6,050,300 to Schwert et al.; U.S. Pat. No. 4,361,451 to Renaud; U.S. Pat. No. 6,539,979 to Driver; U.S. Pat. No. 5,399,301 to Menendez et al.; U.S. Pat. No. 5,816,293 to Kiest, Jr.; U.S. Pat. No. 5,346,658 to Gargiulo; and U.S. Pat. No. 6,093,363 to Polivka. However, the use of heat and/or pressure includes various problems that require a solution. Typically, steam and compressed air are injected in the liner conduit, and this has been successfully accomplished in small sizes in a safe manner. However, as the scale of the process increases, it becomes obvious that the energy from compressible gases in an extended large diameter pipe could be extremely dangerous. In addition, this steam/air injection has little reaction time to respond to process upsets. Still further, the prior art systems do not teach the use of fluid processing system that is integral with and operational in connection with a conduit expansion process.

There also remains a need for mobilizing or otherwise providing an ability to transport equipment utilized in the conduit expansion process in a mobile manner. Various prior art systems have been provided that mobilize various portions of a fluid system, for example U.S. Pat. No. 6,416,692 to Iwasaki-Higbee; U.S. Pat. No. 5,924,455 to Jo et al.; U.S. Pat. No. 5,816,293 to Kiest, Jr.; U.S. Pat. No. 5,501,248 to Kiest, Jr.; U.S. Pat. No. 6,050,300 to Schwert et al.; U.S. Pat. No. 6,539,979 to Driver; and U.S. Pat. No. 5,601,763 to Hunter et al. However, these systems do not allow for a transportable and integrated fluid expansion system. Thus, a need remains for a conduit expansion system that can be assembled on a mobile platform to allow conduit expansion to be routinely done at project locations.

SUMMARY OF THE INVENTION

It is, therefore, an object of the present invention to provide a fluid system for conduit expansion that overcomes the deficiencies of the prior art. It is another object of the present invention to provide a fluid system for conduit expansion that includes a controlled and safe injection of fluid material from a fluid processing system to a conduit expansion system. It is a still further object of the present invention to provide a fluid system for conduit expansion that has inherent stability greater than the prior art. It is yet another object of the present invention to provide a fluid system for conduit expansion that provides uniform expansion of the liner conduit along the length of the expanded liner conduit. It is another object of the present invention to provide a mobile conduit expansion system that overcomes the deficiencies of the prior art. It is a further object of the present invention to provide a system and arrangement for conduit expansion that uses, for example, hot water, that is mobile and easily transportable to a repair site. It is a still further object of the present invention to provide a system and arrangement for conduit expansion that is mobile and allows for a consistent and repeatable conduit expansion process.

In one preferred and non-limiting embodiment, the present invention is directed to a fluid system for conduit expansion for expanding a liner conduit within a host conduit, specifically where the liner conduit is expanded within the host conduit and pressed against an inside wall of the host conduit. The fluid system is a fluid processing system having a fluid injection source for injecting a fluid, such as water, into the conduit expansion system, typically the inside of the liner conduit. In addition, the system includes a fluid recycle return from the conduit expansion system for reprocessing in the fluid processing system. A fluid source provides water to the fluid processing system for further processing and subsequent injection into the conduit expansion system.

In another preferred and non-limiting embodiment, the present invention is directed to a mobile fluid system for use in connection with a conduit expansion system for expanding a liner or conduit within a host conduit. The mobile system includes a mobile unit having a platform upon which to include equipment and is capable of transporting equipment for a conduit expansion process to a location or job site. The platform is preferably a chassis-type structure being of a rigid material capable of withstanding excessive weight and force. Additionally, the platform may include hooks located at the front and rear bumper by which to be transported.

The platform includes a fluid system having a control system. The fluid system may include a fluid tank, a fluid heater, a plurality of pumps, an air blower and the like. The control system may include a PLC and a computer, which is used to communicate and monitor variables, such as temperature and pressure during the conduit expansion process. Additionally, the platform may include other equipment such as a generator, pumps, blowers, compressors, and the like, as well as storage areas for tools and hardware. Preferably, the major components of the conduit expansion system are enclosed in compartmentalized bodies or structures. Such structures will be commonly recognized in appearance and functional standards as known in the truck body industry.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
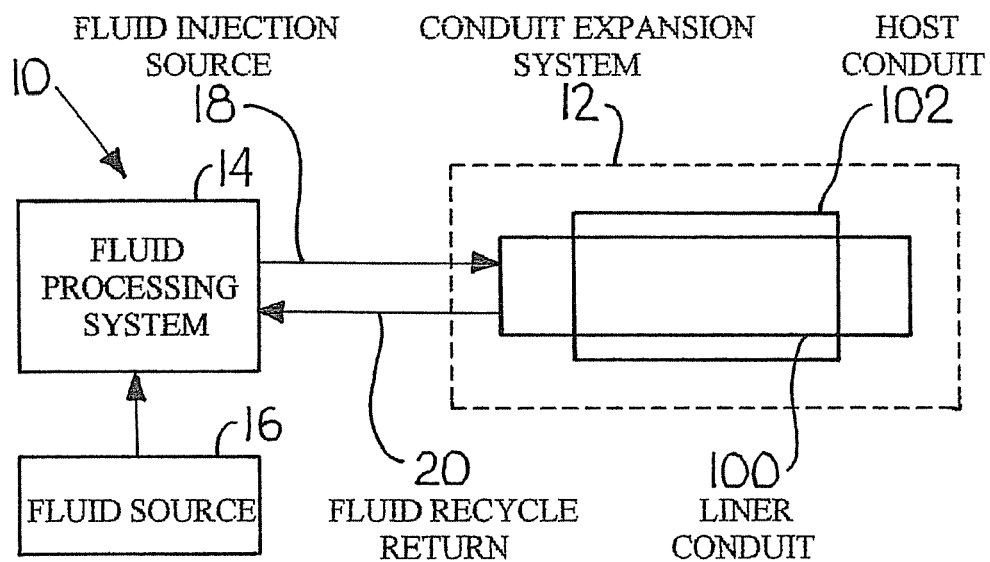
FIG. 1 is a schematic view of a fluid system for conduit expansion according to the present invention.

For purposes of the description hereinafter, the terms "upper", "lower", "right", "left", "vertical", "horizontal", "top", "bottom" "lateral" and "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The present invention is a fluid system 10 for use in connection with a conduit expansion process and is illustrated in various embodiments in FIGS. 1-5. Specifically, with reference to FIG. 1, the fluid system 10 is typically used in connection with a liner conduit 100 that is positioned within a host conduit 102 in a conduit expansion system 12. In a preferred embodiment, this liner conduit 100 is manufactured from a thermoplastic material, such as polyvinyl chloride. However, it is envisioned that any material having the appropriate expansion characteristics can be used, and this fluid system 10 works equally effectively with any expandable liner conduit 100 in a conduit expansion system 12.

Referring to FIG. 1, the fluid system 10 includes a fluid processing system 14 for processing a fluid emanating from a fluid source 16. The processed fluid is injected into the conduit expansion system 12 (and typically the liner conduit 100) via a fluid injection source 18, and after the fluid has been used beneficially in the conduit expansion system 12, it is returned to the fluid processing system 14 via a fluid recycle return 20. Next, the fluid processing system 14 reprocesses the fluid for reuse in the conduit expansion system 12.

It should be noted that the above-discussed systems, and the specific arrangement of the components and subcomponents of these systems, as discussed in detail hereinafter, represent only exemplary embodiments. It is envisioned that the fluid may be both injected through and recycled from fluid injection source 18, while alternatively, the fluid may be injected through the fluid injection source 18 and removed through the fluid recycle return 20. It is only necessary that the fluid is somehow inserted or injected appropriately into the conduit expansion system 12 and, if required, removed therefrom.

Figure 2:
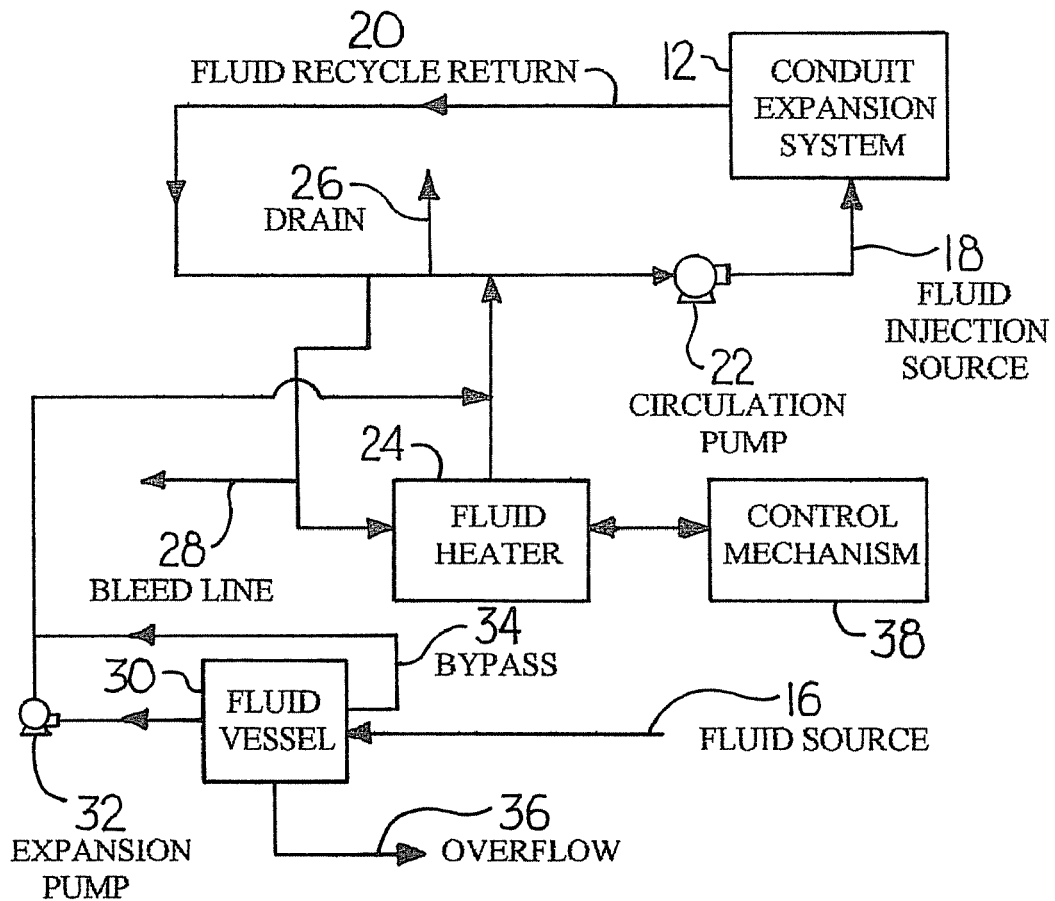
FIG. 2 is a schematic view and flow diagram of a preferred embodiment of a fluid system for conduit expansion according to the present invention.

In one preferred and non-limiting embodiment, as shown in FIG. 2, fluid, typically water, is injected into the conduit expansion system 12 via the fluid injection source 18, as driven by a circulation pump 22. After use in the conduit expansion system 12, the used or spent fluid is returned to the fluid processing system 14 via the fluid recycle return 20. As used and discussed hereinafter, an enormous benefit is recognized by the present invention by using elevated temperature water, since hot water is relatively incompressible and will not fluctuate in temperature or pressure as rapidly as steam and/or air. In addition, since heated water does not have as high of a BTU content as, for example, steam, circulation and BTU replacement issues do not arise as in prior art systems. Therefore, as set forth in detail hereinafter, the fluid will be referred to as water or hot water. The fluid processing system 14 may be either a low or high pressure system.

In a preferred and non-limiting embodiment, the hot water is of sufficient temperature to effect the expansion of the liner conduit within the host conduit. Typically, hot water, having a temperature of at least 125° F., in some cases at least 150° F., in other cases at least 175° F., and in some situations at least 200° F. is used. The water is circulated in the liner conduit 100 until all of the walls of the conduit 100 approach the temperature of the water.

After the water is returned to the fluid processing system 14 via the fluid recycle return 20, it is transferred into a fluid heater 24. The fluid heater 24 re-elevates or heats up the water, and the circulation pump 22 replaces the water in the conduit expansion system 12 via the fluid injection source 18. Prior to return of water through the fluid heater 24, a drain 26 may be used to remove excess water. In addition, a bleed line 28 may be used to bleed off water and/or reduce pressure in the fluid processing system 14.

Hot water may also be added near the exit of the fluid heater 24. Specifically, water may be drawn from a fluid vessel 30 and moved into the system 10 via an expansion pump 32. A bypass line 34 may also draw from the fluid vessel 30, however the bypass line 34, specifically the water in the bypass line 34, is not processed through the expansion pump 32.

Water is transferred into the fluid vessel 30 via the fluid source 16, and this fluid source 16 can be any number of water sources, for example a fire hydrant or the like. In addition, the fluid vessel 30 includes an overflow line 36 for use in conditions where the water in the fluid vessel 30 is excessive in volume.

As shown in FIG. 2, any one or more of the components or subcomponents of the fluid processing system 14 may be controlled and/or monitored by a control mechanism 38. While in the fluid processing system 14 illustrated in FIG. 2, the control mechanism 38 is shown to be in communication with the fluid heater 24. It is envisioned that the control mechanism 38 can be in communication with any of the components or subcomponents, whether individually or collectively, in the fluid processing system 14, the fluid source 16 and/or the conduit expansion system 12. This control mechanism 38 provides computerized control of the measurement and control devices, such as valves, check valves, meters, gauges and the like. In addition, the control mechanism 38 collects information for use in research and developing an improved and more efficient fluid system 10.

In one preferred and non-limiting embodiment, the fluid heater 24 is a single pass heating device with an output of about 60 gallons per minute. In the first pass, the fluid heater 24 can elevate the temperature of the water to 180° F., and, thereafter, use a diesel-operated heating system to further elevate the temperature from about 200° F. to about 210° F. The fluid heater 24 is used to control the temperature of the water in the range of 150° F. to 210° F. By using modified connections on the fluid heater 24, the elevated or heated water can be quickly heated and returned to the conduit expansion system 12 for further use.

From the inlet from the conduit expansion system 12 (fluid recycle return 20), the hot water moves through a basket strainer 54 and into the circulation pump 22. The circulation pump 22 transfers the water through a check valve 46 and into the system for further processing, for example back to the first heater unit 42. In addition, the outlet of the circulation pump 22 includes an air release 56, as well as a measurement device 58. In this embodiment, the measurement device 58 measures pressure. In addition, this outlet line of the circulation pump 22 includes a flow meter 60 for measuring and monitoring flow into the fluid injection source 18.

Figure 3:
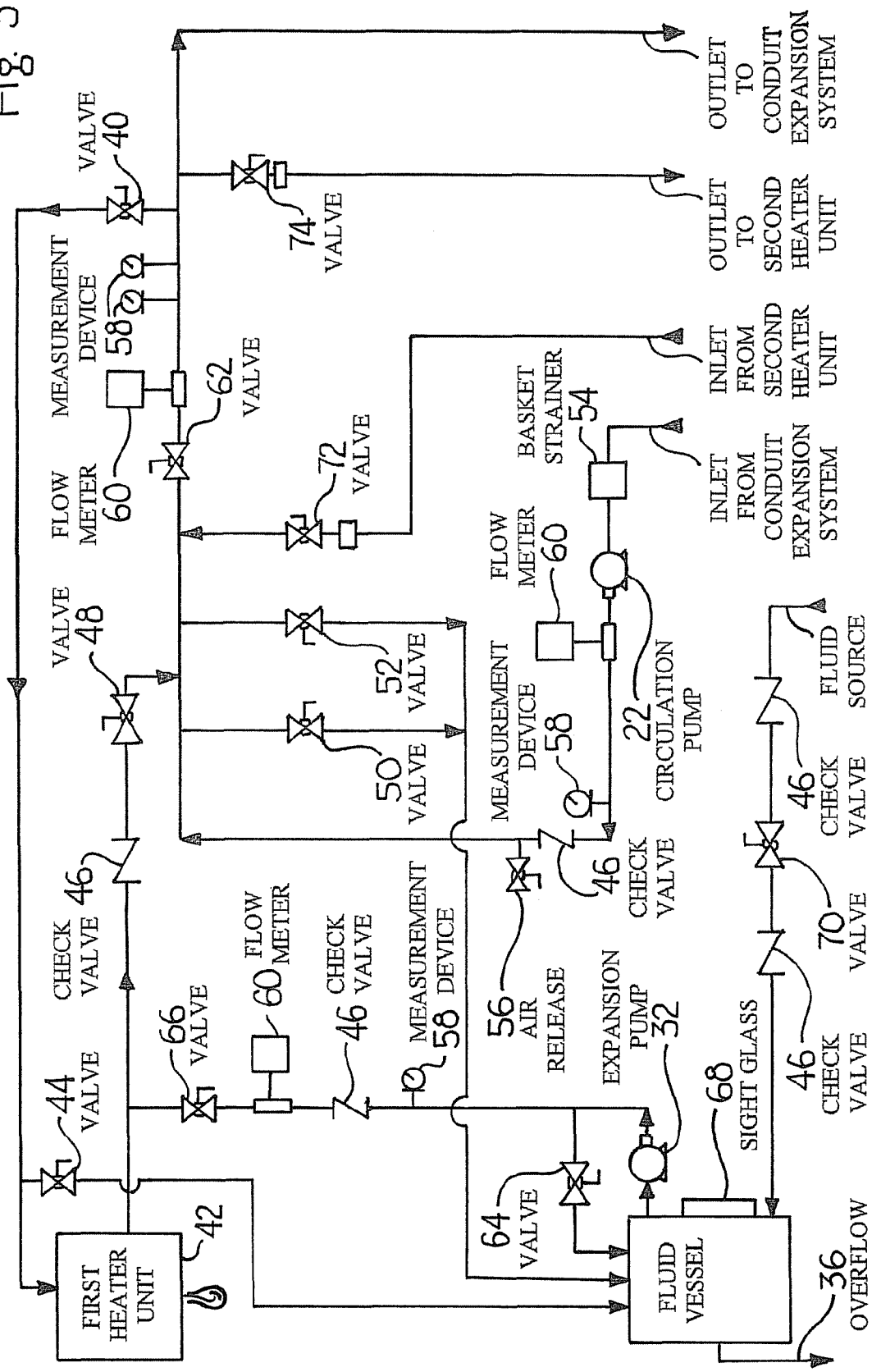
FIG. 3 is a schematic view and flow diagram of a further preferred embodiment of a fluid system for conduit expansion according to the present invention.

Another preferred and non-limiting embodiment is illustrated in FIG. 3. Beginning with the fluid recycle return 20 (or inlet from conduit expansion system 12), the water flows through valve 40 and into the fluid heater 24. Since the system 10 can optionally have more than one fluid heater 24, the water at this point will flow into the first heater unit 42. The water may optionally be transferred through valve 44 and into the fluid vessel 30. After heating by the first heater unit 42, the hot water is moved through a check valve 46 and further through valve 48. At this point, the water may move through a pressure relief valve 50 and back into the fluid vessel 30, or through the added pressure relief dump valve 52, and, again, to the fluid vessel 30.

Returning to the fluid injection source 18, the water may move through valve 62, which acts as the main loop control valve, and, thereafter, interacts with multiple measurement devices 58, one measurement device 58 measuring temperature and the other measurement device 58 measuring pressure. In addition, the water moves through a flow meter 60 after encountering valve 62. Finally, the hot water is transferred to the outlet to the conduit expansion system 12 (fluid injection source 18).

With respect to the fluid vessel 30, the water in the fluid vessel 30 is transferred through the expansion pump 32 and may be returned back to the fluid vessel 30 via valve 64. Alternatively, the water may move by measurement device 58, through check valve 46, further through flow meter 60 and through valve 66, where it is injected into the outlet of the first heater unit 42. The water then flows along the previously-discussed path of check valve 46 and valve 48. Optionally, the discharge of the expansion pump 32 can also flow to or connect to the discharge of the circulation pump 22.

The fluid vessel 30 may be equipped with a sight glass 68 or other level sensing or monitoring device for viewing or sensing the level of water in the fluid vessel 30, and is used in conjunction with the overflow line 36 for managing the volume of water in the fluid vessel 30. In addition, the water enters the fluid vessel 30 from the fluid source 16. Specifically, the water moves through check valve 46, through valve 70 and further through check valve 46 and into the fluid vessel 30.

When using a second heater unit (not shown), water moves from the outlet of this second heater unit to the inlet from the second heater unit and through valve 72, where it proceeds along the same path from the circulation pump 22 as discussed in connection with the previously-discussed first heater unit 42 outlet. Similarly, water can be returned to the second heater unit through valve 74 and into the inlet of the second heater unit.

In this manner, the present invention provides a fluid system 10, including one or more fluid heaters 24, for use in connection with a conduit expansion system 12. This system provides controlled movement of water through the fluid processing system 14 and into the conduit expansion system 12. This water is monitored at various points throughout the system for pressure, temperature, flow, etc. in order to allow for efficient control as well as further system 10 monitoring. In addition, the fluid heater 24 provides this beneficial hot water to the conduit expansion system 12 in a controlled and inherently safer manner. In addition, the use of hot water provides a more stable system and a more uniform heat distribution in the liner conduit of the conduit expansion system 12. Therefore, the fluid system 10 drastically increases the safety, stability and uniformity of the material used in the conduit expansion system 12.

Example

The fluid processing system 14 is capable of providing a variable flow rate of up to 350 gallons per minute up to a pressure of 150 to 200 psi. In addition, the expansion pump 32 also provides a variable flow rate through the piping system up to 70 gallons per minute at a pressure of up to about 210 psi. The fluid heater 24 is a 3.4 MBtu/hour enclosed-flame diesel-powered water heater.

The fluid vessel 30 may have varying capacities, for example, 250 gallons. This fluid vessel 30 allows for inlets from the surge of the hot water fill through valve 44, inlets from the various pressure relief valves 50 and 52, as well as bypass inlet through valve 64. In addition, the fluid vessel 30 uses a sight glass 68, in conjunction with the overflow line 36 for controlling the water in the fluid vessel 30.

The circulation pump 22 and expansion pump 32 should meet the required specifications of the system, for example, the circulation pump 22 may be a 25-30 HP motor with a maximum flow of 350 gallons per minute, while the expansion pump 32 may be a 5-10 HP motor with a maximum flow of 70 gallons per minute. Check valves 46 are used in connection with the other valves of the system to prevent movement of water in the undesired direction. For example, valve 70 can be a backflow preventer for ensuring that water does not move back into the fluid source 16. All of the check valves 46, valves and measurement devices 58 operate in a manner as known in the art.

The fluid heater 24 should be capable of continuous operation and located downstream of the circulation pump 22, such that water supplied to the expansion loop is on the last pass through the fluid heater 24. In addition, the water from the expansion pump 32 should be injected into the fluid heater 24 inlet. The fluid heater 24 should be equipped with a suitable temperature control for maintaining the water temperature under operating conditions after the initial and desired temperature is reached. Still further, the fluid heater 24 should be equipped with any appropriate safety devices for preventing the occurrence of unsafe or potentially damaging conditions. For example, the fluid heater 24 may be supplied with a flame detection circuit, water flow monitors, air flow monitors, spark arresters and temperature switches as needed.

The control mechanism 38 may be in the form of a personal computer, a laptop, a PDA, a printed circuit board, a computerized mechanism, or other means for automatic control of the various components and subcomponents of the fluid processing system 14. For example, the measurement devices 58 may transmit information remotely to the control mechanism 38 and receive control signals from the control mechanism 38 in a wireless or hardwired format. Various diagnostics can be monitored while the fluid processing system 14 is in operation. Further, the control mechanism 38 for the fluid processing system 14 may also be used in connection with the conduit expansion system 12 and the fluid source 16.

Figure 4:
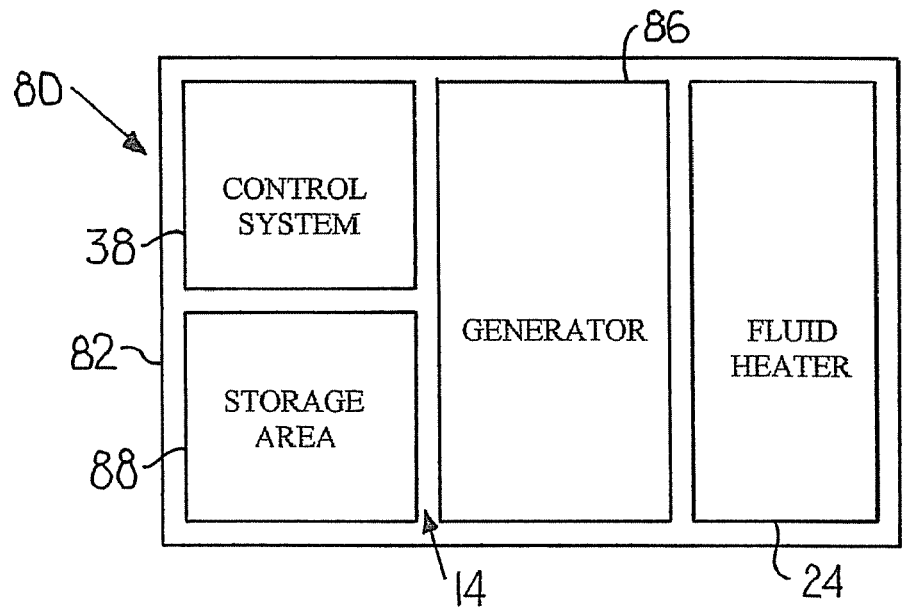
FIG. 4 is a top schematic view of a mobile fluid system for conduit expansion according to the present invention.
Figure 5:
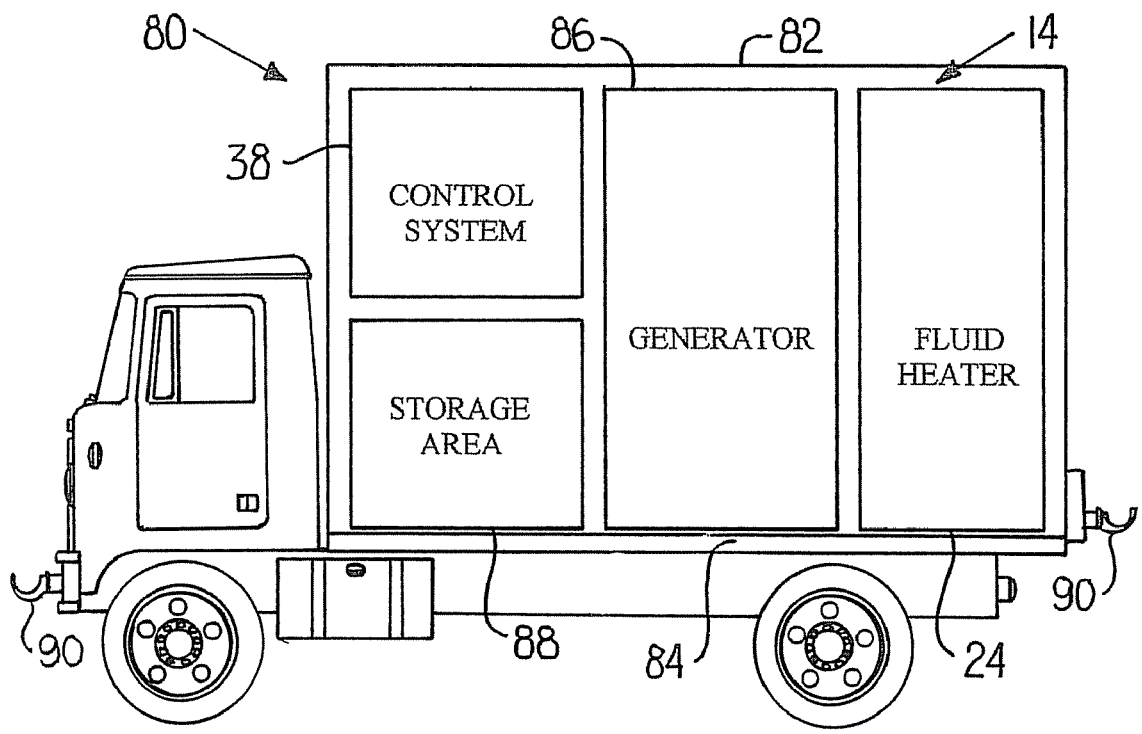
FIG. 5 is a side schematic view of a further preferred embodiment of a mobile fluid system for conduit expansion according to the present invention.

The present invention is also directed to a mobile fluid system 80 for use in connection with the conduit expansion system 12, and this mobile fluid system 80 is positioned on or within a mobile unit 82 for use in connection with the conduit expansion process and is illustrated in various embodiments in FIGS. 4 and 5. The mobile unit 82 may be referred to as a mobile pipe expansion vehicle, mobile conduit expansion unit or the like. The mobile unit 82 is designed to provide the capabilities required for expansion of replacement structural water lines in systems such as stand-alone structural systems used to rehabilitate pressure lines, such as water lines, force mains and other industrial lines. As discussed above, one such example of a process is a conduit expansion process and system 12, which is typically used in connection with the liner conduit 100 positioned within the host conduit 102 in the conduit expansion system 12.

The mobile conduit expansion system 80 includes a mobile unit 82, such as a truck, a vehicle, a trailer, and a skid, having a platform 84 upon which to secure equipment, and which is capable of transporting equipment for a conduit expansion process to a job site. The platform 84 may include steps or a ramp, to facilitate entry, exit and access to the equipment. As illustrated in FIGS. 4 and 5, the equipment on the platform 84 preferably includes the fluid system 10 discussed above, including at least a fluid heater 24, a fluid vessel (not shown) and a control system 38, as well as a generator 86 and storage area 88. While the present invention is referred to in terms of a fluid system 10 and control system 38, it is by no means limited to only a fluid system 10 and control system 38. The equipment on the platform 84 may relate to pressure systems, heat systems, and the like, and will include equipment as known by one skilled in the art, such as the generator 86, as well as pumps and valves utilized in the system and process.

The platform 84 is preferably a chassis-type structure being of rigid material capable of withstanding excessive weight and force. The chassis is preferably rated to sustain loads imposed by the vehicle at highway speeds. The chassis may also include hooks 90 located at the front and rear bumper by which to be transported. Additional equipment that may be located on the chassis, including those described hereinafter, may include the following: heater/defroster, lights, electric wipers and washer, rearview mirrors, vinyl seat trim, etc. Optionally, an engine hour meter may be located in the cab to record truck engine operating hours.

Items may be located in various areas on the platform 84. For example, while a pump may be placed on the platform 84, it may also be located underneath the platform 84. Another example includes placing a hose reel for an air compressor or even a hose storage rack on the bottom or back of the platform 84. Thus, the equipment may be arranged in such a manner so as to allow efficient use of space on the platform 84, allow for placement of equipment in a desired process arrangement, etc.

The mobile fluid system 80 positioned on the mobile unit 82 operates substantially as described above in connection with the fluid system 10. Accordingly, the mobile fluid system includes the fluid processing system 14 for processing a fluid emanating from a fluid source 16. The fluid processing system 14 operates as described above.

The mobile fluid system 80 also has adequate access to components for servicing or removal of the equipment positioned on the mobile unit 82 and/or platform 84. Isolation shutoff valves may be installed at locations where large spillage may occur if a line were to break or a valve where needed for safe operation of the mobile unit 82. A back flow preventer may also be installed on the inlet of the fill line to prevent water from back flowing, which is particularly undesirable in the mobile fluid system 80. The water system also includes a dump valve to remove water from the loop during initial heat-up with an outlet connected to the water tank. The system may also include a deaerator at the inlet to the heater.

As with the fluid system 10 described above, the mobile fluid system 80, and any one or more of the components or subcomponents of the mobile fluid system 80 may be controlled and/or monitored by the control system 38, also positioned on or within the mobile vehicle 82. The control system 38 may include a room having a PLC and a computer used to communicate and monitor temperature and pressure of the conduit expansion system 12. While in the fluid processing system 14, the control mechanism 38 is shown to be in communication with the fluid heater 24, it is envisioned that the control mechanism 38 can be in communication with any of the components or subcomponents, whether individually or collectively, in the fluid processing system 14, the fluid source 16 and/or the conduit expansion system 12.

Additional process controls in the control system 38 may include remote-mounted temperature and pressure sensors using wireless data transmission. Additionally, the control room may include on/off controls within the control room for the heater. Other heater control box displays (LED) may include heater performance features, such as hours of operation, fuel pressure, de-icing water temperature, diagnostic features located at the heater.

Overall, the components of the mobile fluid system 80 are preferably enclosed in a compartmentalized type structure, with the platform 84 body having an external appearance of one continuous enclosure. The heater exhausts preferably exit toward the top side of the mobile unit 82 to minimize damage to equipment parked to either side. Shrouding may be utilized to cover in efforts to help minimize noise. Additionally, the platform 84 may include storage areas for tools, hardware and pipe storage compartments. Access doors may be included to aid in maintenance as well as lockable latches. Louvers may also be provided for adequate ventilation.

In this manner, the present invention also provides a mobile fluid system 80, including the fluid processing system 14 and a control system 38 for use in connection with a conduit expansion system 12. This system 80 provides for the controlled movement of fluid, preferably water, through the fluid processing system 14 and into the conduit expansion system 12. The mobile fluid system 80 drastically increases the ease with which to transport equipment used for, as well as perform, the conduit expansion process. It also increases safety, stability and uniformity of the process.

Example

The mobile fluid system 80 includes a Ford F-650 truck chassis as the mobile unit 82, which includes a platform 84, and has a 7.2 L diesel engine, automatic. Power steering and hydraulic braking systems are provided. Axle ratings of the chassis may be about 8,500 lbs on the front axle, about 17,500 lbs on the rear axle and about 26,000 lbs total. The chassis batteries include two 550 CCA each for a total of 1100 CCA Group 31. The wheelbase may be 194" with a CA of 120". The fuel tank of the chassis may have a capacity of about 50 gallons.

The fluid processing system 14 is capable of providing a variable flow rate of up to 350 gallons per minute up to a pressure of 150 psi. In addition, the expansion pump also provides a variable flow rate through the piping system up to 70 gallons per minute at a minimum pressure of 210 psi. The fluid heater 24 is a 3.4 MBtu/hour enclosed-flame diesel-powered water heater.

The fluid vessel may have varying capacities, for example, 250 gallons. This fluid vessel allows for inlets from the surge of the hot water fill through a valve, inlets from the various pressure relief valves, as well as a bypass inlet through a valve. In addition, the fluid vessel uses a sight glass, in conjunction with the overflow line for controlling the water in the fluid vessel.

The circulation pump and expansion pump should meet the required specifications of the system, for example, the circulation pump may be a 25 HP motor with a maximum flow of 350 gallons per minute, while the expansion pump may be a 5 HP motor with a maximum flow of 70 gallons per minute. Check valves are used in connection with the other valves of the system to prevent movement of water in the undesired direction. For example, valves can be a backflow preventer for ensuring that water does not move back into the fluid source 16. All of the check valves, valves and measurement devices operate in a manner as known in the art.

The fluid heater 24 should be capable of continuous operation and located downstream of the circulation pump 22, such that water supplied to the expansion loop is on the last pass through the fluid heater 24. In addition, the water from the expansion pump should be injected into the fluid heater 24 inlet. The fluid heater 24 should be equipped with a suitable temperature control for maintaining the water temperature under operating conditions after the initial and desired temperature is reached. Still further, the fluid heater 24 should be equipped with any appropriate safety devices for preventing the occurrence of unsafe or potentially damaging conditions.

The control system 38 may be in the form of a personal computer, a laptop, a PDA, a printed circuit board, a computerized mechanism, or other means for automatic control of the various components and subcomponents of the fluid processing system 14. For example, the measurement devices may transmit information remotely to the control system 38 and receive control signals from the control system 38 in a wireless format. Various diagnostics can be monitored while the fluid processing system 14 is in operation. Further, the control system 38 for the fluid processing system 14 may also be used in connection with the conduit expansion system.

The present invention provides a fluid system 10 that overcomes the deficiencies of the prior art by using hot water as an injection material into a conduit expansion system 12, as opposed to steam and/or compressed air. Therefore, the fluid system 10 of the present invention is safer, more stable and provides greater uniformity than similar systems and materials in the prior art. Further, all of the components and subcomponents of the fluid system 10 can be monitored and controlled to further enhance the beneficial characteristics of the present invention. In addition, the present invention provides a mobile fluid system 80 that overcomes the deficiencies of the prior art by being a mobile unit 82 that can be moved or transported easily to a job location. Therefore, the mobile fluid system 80 of the present invention is safer, more stable, provides greater uniformity than similar systems and materials in the prior art, as well as easily transportable. Further, all of the components and subcomponents of the fluid system 10 can be monitored and controlled from the mobile unit 82 to further enhance the beneficial characteristics of the present invention.

This invention has been described with reference to the preferred embodiments. Obvious modifications and alterations will occur to others upon reading and understanding the preceding detailed description. It is intended that the invention be construed as including all such modifications and alterations.

We claim:

1. A conduit expansion method, comprising:
    inserting a liner conduit formed from a polyvinyl chloride material at least partially within a host conduit; circulating fluid within an inner area of the liner conduit;
    injecting fluid into the inner area of the liner conduit; and processing at least a portion of the circulating fluid by supplying fluid from a fluid source to a fluid processing system for further circulation and/or injection into the inner area of the liner conduit;
    wherein the liner conduit at least partially expands within the host conduit, and
    wherein the fluid processing system is part of a fluid system along with a conduit expansion system and comprises a circulation pump, a fluid heater located downstream of the circulation pump and a control mechanism operatively coupled to at least one of the circulation pump and the fluid heater, the control mechanism configured to measure and monitor fluid temperature, fluid flow rate and fluid pressure at a plurality of points within the fluid system and control fluid temperature, fluid flow and fluid pressure.

2. The conduit expansion method of claim 1, wherein the fluid is water.

3. The conduit expansion method of claim 1, wherein the fluid is circulated or injected at a specified temperature.

4. The conduit expansion method of claim 3, wherein the fluid is at a temperature sufficient to heat the walls of at least a portion of the liner conduit.

5. The conduit expansion method of claim 3, wherein the fluid is at a temperature sufficient to at least partially expand the liner conduit within the host conduit.

6. The conduit expansion method of claim 3, wherein the temperature is in the range of about 125° F. to about 220° F.

7. The conduit expansion method of claim 1, wherein, after fluid is returned from the inner area of the liner conduit, re-heating the fluid prior to injection into the inner area of the liner conduit.

8. The conduit expansion method of claim 1, further comprising monitoring at least one of the following: at least one operating parameter of at least one component or piece of equipment used to implement the conduit expansion method, at least one characteristic of at least a portion of the conduit expansion method, or any combination thereof.

9. The conduit expansion method of claim 1, further comprising mobilizing at least one component or piece of equipment used to implement the conduit expansion method.

10. The conduit expansion method of claim 1, further comprising providing at least one safety feature for controlling at least one component or piece of equipment used to implement the conduit expansion method.

11. The conduit expansion method of claim 1, wherein the fluid is circulated and/or injected at a specified pressure.

12. The conduit expansion method of claim 1, wherein the fluid is circulated and/or injected at a specified flow rate.

13. A conduit expansion method, comprising: inserting a liner conduit formed from a polyvinyl chloride material at least partially within a host conduit;
    circulating water within an inner area of the liner conduit;
    injecting water into the inner area of the liner conduit; and
    processing at least a portion of the circulating water by supplying water from a water source to a fluid processing system for further circulation and/or injection into the inner area of the liner conduit;
    wherein the liner conduit at least partially expands within the host conduit; and
    wherein the fluid processing system comprises a circulation pump, a fluid heater located downstream of the circulation pump, and a control mechanism-operatively coupled to at least one of the circulation pump and the fluid heater, the control mechanism configured to measure and monitor water temperature, water flow rate, and water pressure at a plurality of points within the fluid processing system and control water temperature, water flow and water pressure.

14. A conduit expansion method, comprising:
    inserting a liner conduit formed from a polyvinyl chloride material at least partially within a host conduit;
    circulating fluid within an inner area of the liner conduit, wherein the fluid is heated during circulation;
    maintaining the fluid at a specified temperature, pressure, and flow rate after the specified temperature, pressure, and flow rate are reached using a fluid processing system; and injecting the fluid into the inner area of the liner conduit at the specified temperature, pressure, and flow rate;
    wherein the liner conduit at least partially expands within the host conduit; and
    wherein the fluid processing system comprises a circulation pump, a fluid heater located downstream of the circulation pump, and a control mechanism-operatively coupled to at least one of the circulation pump and the fluid heater, the control mechanism configured to measure and monitor fluid temperature, fluid flow rate, and fluid pressure at a plurality of points within the fluid processing system and control fluid temperature, fluid flow, and fluid pressure.

15. A conduit expansion method, comprising: providing a fluid system comprising:
    a conduit expansion system;
    a fluid injection source coupled to an inlet of the conduit expansion system;
    a fluid recycle return coupled to an outlet of the conduit expansion system; and
    a fluid processing system having an outlet coupled to the fluid injection source and an inlet coupled to the fluid recycle return, the fluid processing system comprising: a circulation pump, a fluid heater located downstream of the circulation pump, and a control mechanism operatively coupled to at least one of the circulation pump and the fluid heater;
    inserting a liner conduit formed from a polyvinyl chloride material at least partially within a host conduit to form the conduit expansion system;
    injecting heated water into an inner area of the liner conduit via the fluid injection source;
    circulating heated water within the inner area of the liner conduit until all walls of the host conduit approach the temperature of the heated water;
    returning the circulated heated water to the fluid processing system via the fluid recycle return; and
    processing the returned water by adjusting the temperature, fluid flow rate, and fluid pressure of the water based on input from the control mechanism,
    wherein the control mechanism is configured to measure and monitor water temperature, fluid flow rate, and fluid pressure at a plurality of points within the fluid processing system and control water temperature, fluid flow, and fluid pressure.

16. The conduit expansion method of claim 13, further comprising measuring at least one of the following: at least one operating parameter of at least one component or piece of equipment used to implement the conduit expansion method, at least one characteristic of at least a portion of the conduit expansion method, or any combination thereof.

17. The conduit expansion method of claim 14 further comprising controlling at least one of the following: at least one operating parameter of at least one component or piece of equipment used to implement the conduit expansion method, at least one characteristic of at least a portion of the conduit expansion method, or any combination thereof.

* * * * *

UNITED STATES PATENT AND TRADEMARK OFFICE
CERTIFICATE OF CORRECTION

| | | |
|---|---|---|
| PATENT NO. | : 8,137,599 B2 | Page 1 of 1 |
| APPLICATION NO. | : 12/347121 | |
| DATED | : March 20, 2012 | |
| INVENTOR(S) | : Mark A. Smith et al. | |

It is certified that error appears in the above-identified patent and that said Letters Patent is hereby corrected as shown below:

IN THE CLAIMS:

Column 12, Line 3, Claim 13, delete "mechanism-operatively" and insert -- mechanism operatively --

Column 12, Line 25, Claim 14, delete "mechanism-operatively" and insert -- mechanism operatively --

Signed and Sealed this
Twenty-sixth Day of June, 2012

David J. Kappos
*Director of the United States Patent and Trademark Office*